(12) United States Patent
Lloyd et al.

(10) Patent No.: US 8,245,130 B1
(45) Date of Patent: Aug. 14, 2012

(54) PERFORMING AN ESTIMATION ON CONTENT TO BE PRESENTED

(75) Inventors: Matthew I. Lloyd, San Francisco, CA (US); Stanley Chen, Mountain View, CA (US)

(73) Assignee: Google Inc., Mountain View, CA (US)

( * ) Notice: Subject to any disclaimer, the term of this patent is extended or adjusted under 35 U.S.C. 154(b) by 868 days.

(21) Appl. No.: 11/756,041

(22) Filed: May 31, 2007

(51) Int. Cl.
*G06F 17/30* (2006.01)
(52) U.S. Cl. .................... 715/238; 715/234; 715/240
(58) Field of Classification Search .................. 715/100, 715/229, 234, 238, 240, 243, 246, 254
See application file for complete search history.

(56) References Cited

U.S. PATENT DOCUMENTS

| | | | | |
|---|---|---|---|---|
| 5,657,091 A | * | 8/1997 | Bertram | 725/37 |
| 6,011,546 A | * | 1/2000 | Bertram | 715/700 |
| 6,101,513 A | * | 8/2000 | Shakib et al. | 715/234 |
| 7,047,033 B2 | * | 5/2006 | Wyler | 455/552.1 |
| 7,051,276 B1 | * | 5/2006 | Mogilevsky et al. | 715/209 |
| 7,337,394 B2 | * | 2/2008 | Nitta et al. | 715/210 |
| 7,362,311 B2 | * | 4/2008 | Filner et al. | 345/169 |
| 7,496,845 B2 | * | 2/2009 | Deutscher et al. | 715/726 |
| 7,610,394 B2 | * | 10/2009 | Katinsky et al. | 709/231 |
| 7,624,021 B2 | * | 11/2009 | Stewart et al. | 704/500 |
| 7,647,553 B2 | * | 1/2010 | Mogilevsky et al. | 715/247 |
| 7,751,623 B1 | * | 7/2010 | Simmons et al. | 382/186 |
| 2002/0114515 A1 | * | 8/2002 | Hotta et al. | 382/177 |
| 2002/0144055 A1 | * | 10/2002 | Nitta et al. | 711/108 |
| 2003/0137531 A1 | * | 7/2003 | Katinsky et al. | 345/716 |
| 2003/0174160 A1 | * | 9/2003 | Deutscher et al. | 345/716 |
| 2005/0015708 A1 | * | 1/2005 | Tamaru | 715/500 |
| 2005/0234893 A1 | * | 10/2005 | Hirsch | 707/3 |
| 2007/0038643 A1 | * | 2/2007 | Epstein | 707/10 |
| 2008/0046803 A1 | * | 2/2008 | Beauchamp et al. | 715/212 |

OTHER PUBLICATIONS

'Netscape (web browser)' [online]. Wikipedia, [retrieved on Jul. 2, 2009] [published on Dec. 2, 2007]. Retrieved from the internet: http://web.archive.org/web/20071202041846/http://en.wikipedia.org/wiki/Netscape_(web browser), pp. 1-9.
'Internet Explorer' [online]. Wikipedia, [retrieved on Jul. 2, 2009] [published on Oct. 31, 20071]. Retrieved from the internet: http://web.archive.org/web/20071031044135/http://en.wikipedia.org/wiki/Internet_explorer, pp. 1-14.

* cited by examiner

*Primary Examiner* — Stephen Hong
*Assistant Examiner* — Gregory J Vaughn
(74) *Attorney, Agent, or Firm* — Fish & Richardson P.C.

(57) ABSTRACT

A computer-implemented method for performing an estimation on content to be presented includes parsing content that is to be presented in a graphical user interface. The method includes estimating, based on the parsing, a size aspect that the content will have when presented in the graphical user interface. The method includes recording the estimated size aspect. A system includes a parser parsing content that is to be presented in a graphical user interface. The system includes an estimation module estimating, based on the parsing, a size aspect that the content will have when presented in the graphical user interface. The system records the estimated size aspect.

20 Claims, 5 Drawing Sheets

PERFORMING AN ESTIMATION ON CONTENT TO BE PRESENTED

TECHNICAL FIELD

This document relates to performing an estimation on content.

BACKGROUND

In the online environment advertising has taken on a substantial presence with the vast increase in the use of that medium that was fueled by the so-called Internet revolution. One example of online advertising is that an advertisement can be displayed as an identifiable portion or area on the screen, for example in form of a banner or a box. The advertising content can be displayed on a screen where there is also other content.

The increase in use of computer-based devices and the increasing prevalence of advertisements in such fields have also brought some opportunities for tracking and evaluating advertisement efforts. For example, ads that are published online are sometimes created with one or more hyperlinks that the viewer can click on to get more information or to purchase the offered goods or services. Because this action by the user is performed in a controlled (e.g. digital processor-based) environment, the user's act of clicking can be detected if so desired and the fact that the user clicked can later be used for one or more purposes, such as to measure whether the ad generates sufficient interest among the public or to determine the price that should be paid for publishing it.

SUMMARY

The invention relates to performing an estimation on content.

In a first aspect, a computer-implemented method for performing an estimation on content to be presented includes parsing content that is to be presented in a graphical user interface. The method includes estimating, based on the parsing, a size aspect that the content will have when presented in the graphical user interface. The method includes recording the estimated size aspect.

Implementations can include any, all or none of the following features. The size aspect can reflect a vertical height of the content when presented in the graphical user interface. Estimating the size aspect can include estimating a dimension of the content in a number of pixels. At least part of the content can be in plain text format, and the parsing can include at least one sentence length in the content and whether there is any newline character in the content. The estimation can use the at least one sentence length and a character-per-line ratio. At least part of the content can be in HTML format and the parsing can be performed on an HTML tree. The estimation can be configured to take into consideration at least one of: a sentence length in the content; a style change in the content; a tag that causes a line break when the content is presented in the graphical user interface; information from an image tag; a number of rows in a <textarea> tag; a cell height in a table; and combinations thereof. The method can further include receiving a display width of a program that is to be used for generating the graphical user interface; and using the display width in the estimation. The graphical user interface may be generated on another device and the display width can be received from the other device together with a request to provide the contents to the other device. The parsing and the estimation can be performed at a server device before forwarding the contents to a client device to be presented in the graphical user interface, and the parsing performed at the server device can include processing executable code to render a virtual presentation of the contents at the server; and the estimation can include measuring an actual size aspect of the content in the virtual presentation. The method can further include requesting advertisement content to be presented together with the content in the graphical user interface, the advertisement content being requested so that a size aspect of the advertisement content is to have a predefined relationship with the estimated size aspect.

In a second aspect, a computer program product is tangibly embodied in an information carrier and includes instructions that when executed by a processor perform a method for performing an estimation on content to be presented. The method includes parsing content that is to be presented in a graphical user interface. The method includes estimating, based on the parsing, a size aspect that the content will have when presented in the graphical user interface. The method includes recording the estimated size aspect.

In a third aspect, a system includes a parser parsing content that is to be presented in a graphical user interface. The system includes an estimation module estimating, based on the parsing, a size aspect that the content will have when presented in the graphical user interface. The system records the estimated size aspect.

Implementations can include any, all or none of the following aspects. The system can receive a display width of a program that is to be used for generating the graphical user interface, and the estimation module can use the display width in the estimation. The graphical user interface can be generated on another device and the system can receive the display width from the other device together with a request to provide the contents to the other device. The system can forward the contents to a device to be presented in the graphical user interface, and: the parser can process executable code to render a virtual presentation of the contents at the server; and the estimation module can measure an actual size aspect of the content in the virtual presentation. The system can request advertisement content to be presented together with the content in the graphical user interface, the advertisement content being requested so that a size aspect of the advertisement content is to have a predefined relationship with the estimated size aspect.

Implementations can provide any, all or none of the following advantages: providing an estimation of a size aspect of content for a page; providing an improved user interface; providing improved page generation; and providing improved placement of content (such as an advertisement) in a generated page.

The details of one or more embodiments of the invention are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
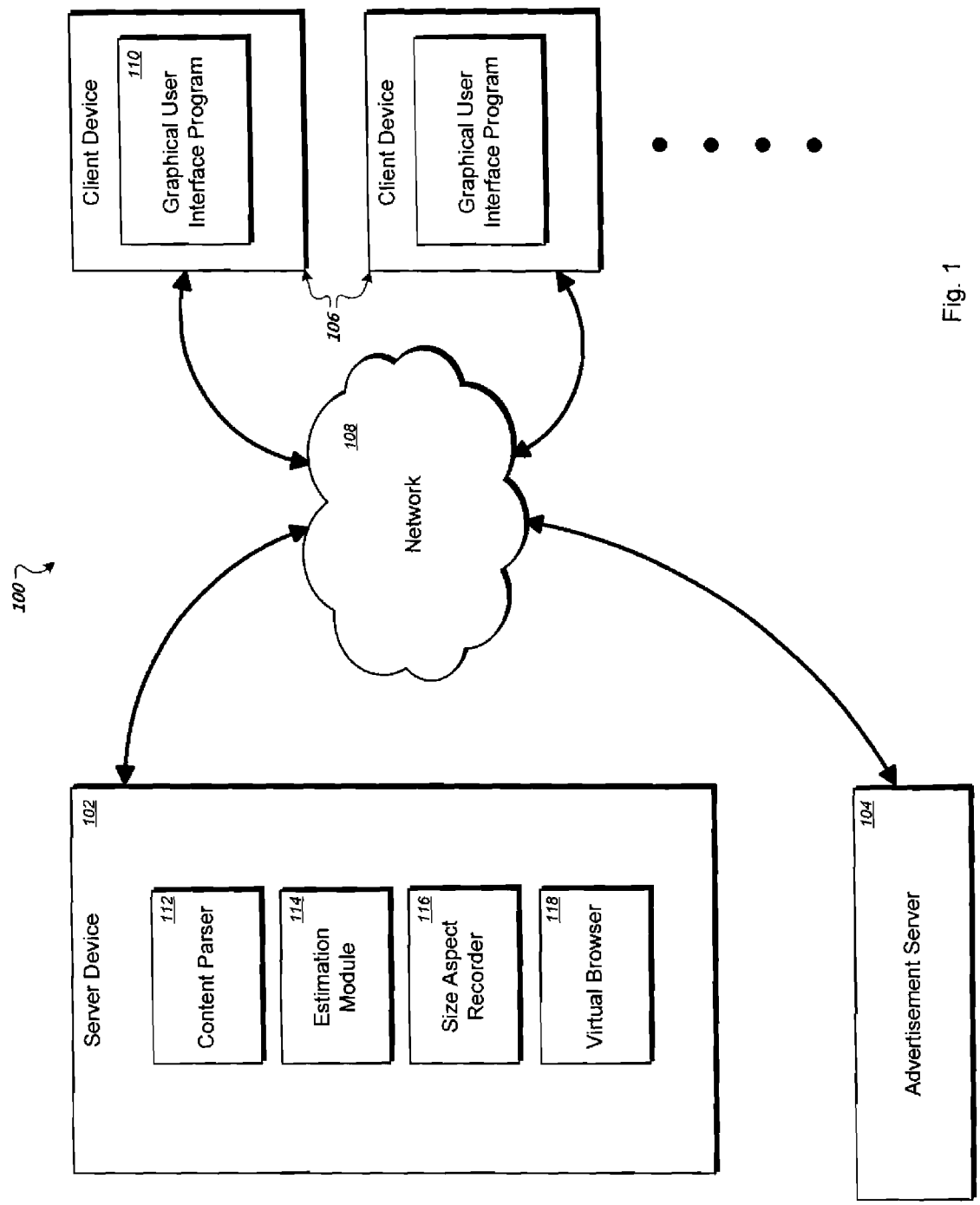
FIG. 1 shows an example of a system that can be used to serve advertising to an end user based on analyzing and estimating attributes of content.

FIG. 1 shows an example of a system 100 that can be used for accessing and analyzing content over a network, among other uses. The system 100 includes a server device 102, an advertisement server 104, and one or more client devices 106. The system components are connected by a network 108, such as a private network or the Internet. Other architectures can be used, including some that do not have a client-server configuration.

An example of this system in operation could allow a user to browse electronic mail within a graphical user interface (GUI) program 110, such as a web browser, on one of the client devices. The client device could be an internet-connected personal computer, a handheld device, or a cellular telephone, to name a few examples. Information can be transferred between two or more of the server device 102, the advertisement server 104, and the client devices 106 over the network 108. For example, the user may wish to view an email message on a web browser on a client computer. In such an example, a company operating the server device 102 may wish to show the user additional content such as an advertisement in connection with that message. The placement of an advertisement on the page in some implementations is done by estimating a size of the content of the message before the screen is actually rendered and then optionally matching a size of the advertisement to the estimated size. There can be other reasons why a size is estimated, for example to optimize use of available screen space or to match a screen resolution. Within the server device or elsewhere there can be provided one or more components useful for analyzing content to extract information useful for making a size estimation, as will be described in examples below.

The server device 102 in this example contains a content parser 112, an estimation module 114, and a size aspect recorder 116. The content parser 112 can examine specific contents, such as the contents of a message. In some implementations, this can be done by dividing the contents into logical pieces, to do further processing of the contents (e.g. message). The estimation module may access the parsed content and estimate a height or other size aspect thereof. Alternatively, the height may be estimated by rendering the content item, for example in a virtual browser 118.

The size aspect recorder 116 can store the estimated size aspect, such as a height received from the estimation module 114, and may record additional information. For example, the size aspect recorder may record a summation of heights from the estimation module along with appropriate content item identification strings. The server device 102 in some implementations communicates this information to another component to use it, such as the advertisement server 104 which can use the information to determine an appropriate number of advertisements and/or the sizes of advertisements to be presented to the end user, to name a few examples.

The advertisement server 104 can provide advertisement content for display. The server device 102 may send information through the network 108 to the advertisement server 104 to fetch appropriate content for the user. This information may include height data computed by the estimation module 114. For example, the modules within the server device 102 may calculate that an email message will require a certain number of pixels to be displayed in a web browser in the client device 106. The server device 102 can then send this calculated number to the advertisement server so that the advertisement server 104 can send one or more appropriate advertisements for presentation in the web browser. The advertisements, along with the email message can be rendered within the graphical user interface program 110 on the client device 106.

Figure 2:
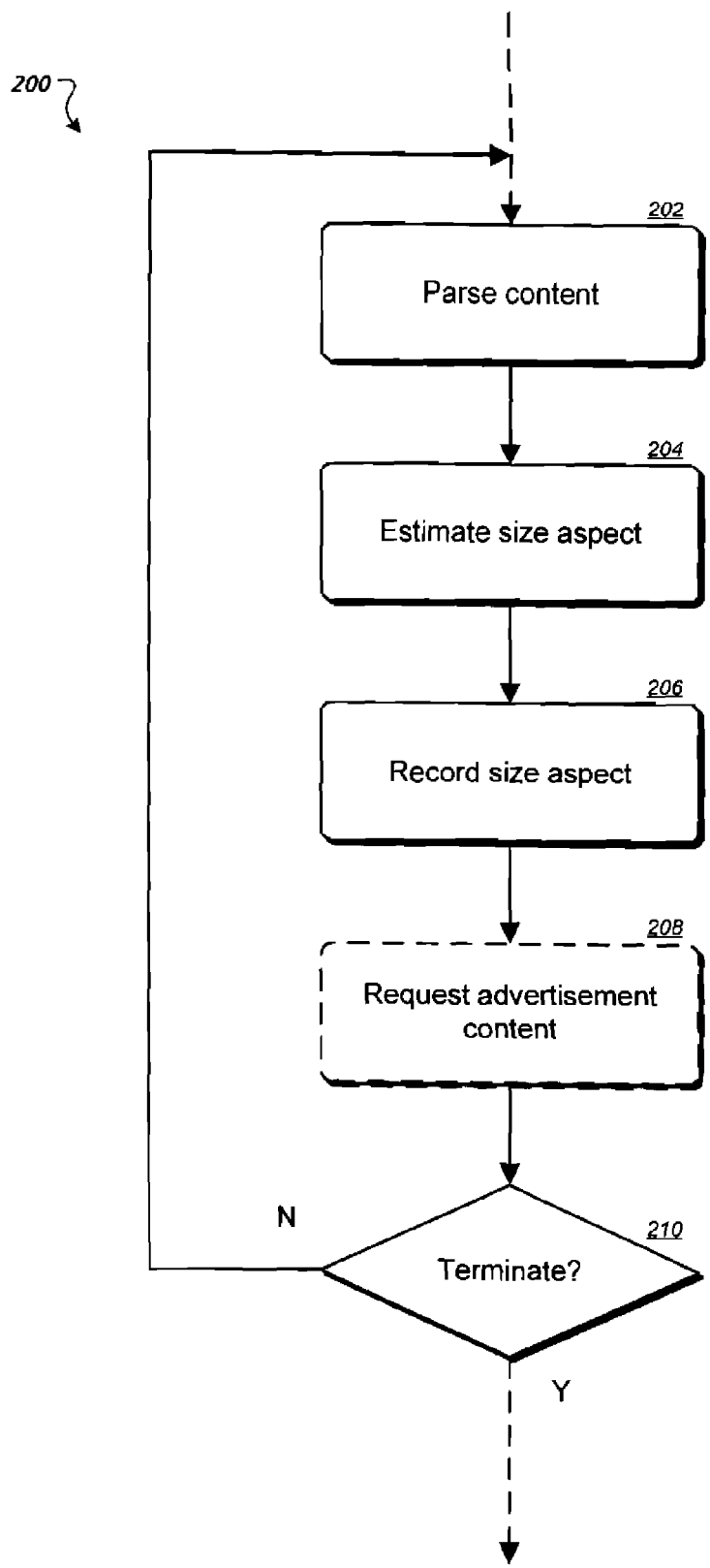
FIG. 2 is a flow chart illustrating example content processing in which content is analyzed and an estimated size aspect is recorded.

FIG. 2 shows an example of a procedure 200 that can be performed when processing content. The procedure here includes a parse content step 202, an estimate size aspect step 204, a record size aspect step 206, an optional request advertisement content step 208, and a decision step 210 to either terminate or begin the sequence again. Other steps can be performed before, after and/or in between the steps of procedure 200 but are not shown here, for clarity.

In the step 202, content that is to be presented in a graphical user interface is parsed. The parse content step 202 can be performed by the content parser 102, in some implementations. For example, the parser may divide an HTML-based character stream corresponding to an email message into its constituent elements and then send the results of the parsing to the estimation module 114.

In step 204, there is performed an estimation, based on the parsing, of a size aspect that the content will have when presented in the graphical user interface. The estimate size aspect step 204 can be performed using the estimation module 114. A module performing this step may, for example, assign a numerical value to each element depending on type, length and/or location within the nesting structure of the content item, to name a few attributes. The module may then add up the separate values to determine the height or other size aspect.

In step 206, the estimated size aspect is recorded. The resultant size aspect can be recorded in step 206 on some storage medium, for example a location in memory or on disk. For example, the size aspect recorder 116 can record the estimated size aspect.

In the optional request advertisement content step 208, the size aspect data, optionally along with any other relevant data, can be forwarded to the advertisement server 104 or another device, to retrieve advertisement content. The next step in the process can be the decision step 210 for the termination of the process.

Figure 3:
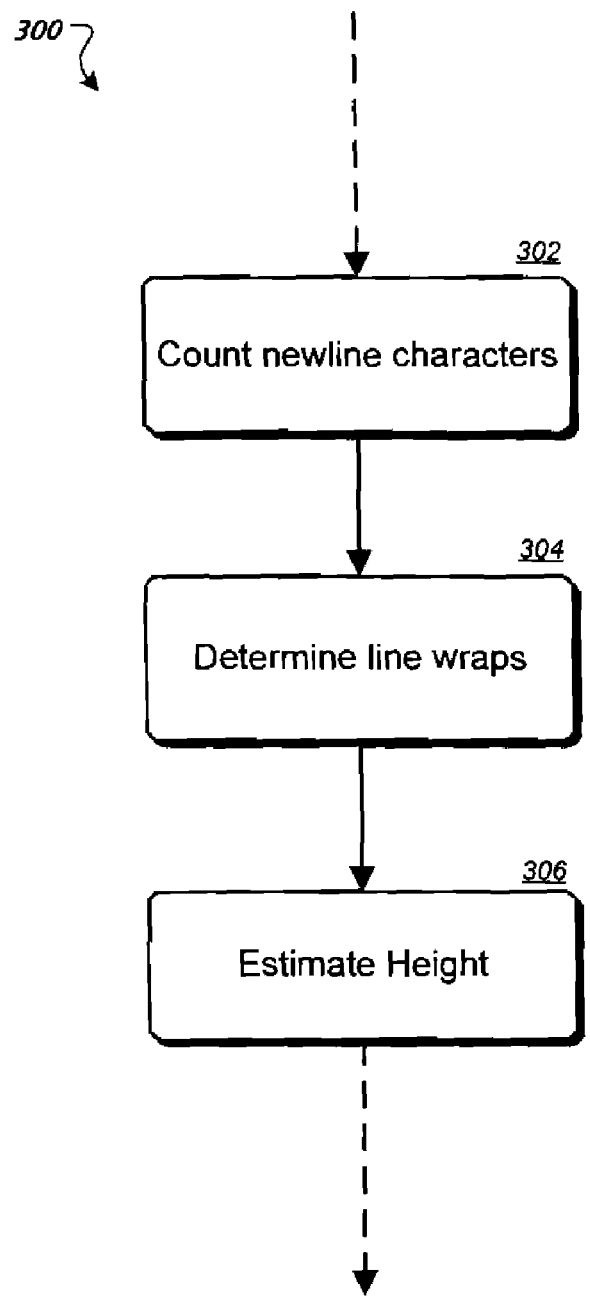
FIG. 3 is a flow chart illustrating an example text analysis process.

FIG. 3 shows an example procedure 300 for text processing that may take place during the estimation performed on the server device, to name one example. The procedure includes a step 302 to count newline characters, a step 304 to determine line wraps, and a step 306 to estimate height. In step 302, a value representing the number of newline characters, such as a carriage return, that are included in the content item can temporarily be stored. For example, the content parser 112 can count the newline characters of a message to be displayed in the GUI 110. The content parser can also determine at least one sentence length of the message.

In step 304, the content parser 112 and/or the estimation module 114 can determine the number of lines that the content item (e.g. an email message) will occupy when displayed on a screen. An example of step 304 may include counting the number of characters in between newline characters and dividing a value representing that number of characters by a value representing the width of the display to determine how many line wraps will be needed to display said text. In so doing, different characters may be 'weighted' differently, for example the letter 'I' might take less horizontal space to render than the letter 'W' depending on the font used. In step 306 the values determined in previous steps may be summed to determine an estimate of the height of the text to be rendered. Particularly, font size (or other aspects) can be affected by a cascading style sheet (CSS) and this can be detected and taken into account. In so doing, formatting commands that do not affect the height of the text when rendered (such as italicizing) can be ignored. Other steps can be performed before, after and/or in between the steps of the procedure 300. For example, the estimation module 114 can sum up the heights required by the newline character(s) counted in step 302 and the line wraps identified in step 304.

The width of the browser or other client program window can be determined locally at the device where the page is to be rendered. For example, the program 110 (or a portion thereof, such as a transcript routine) can determine the width of the window in realtime and forward this information to the device performing the estimation. This can provide that the estimation takes into account the current width of the window for a better estimation of the height or size aspect.

Figure 4:
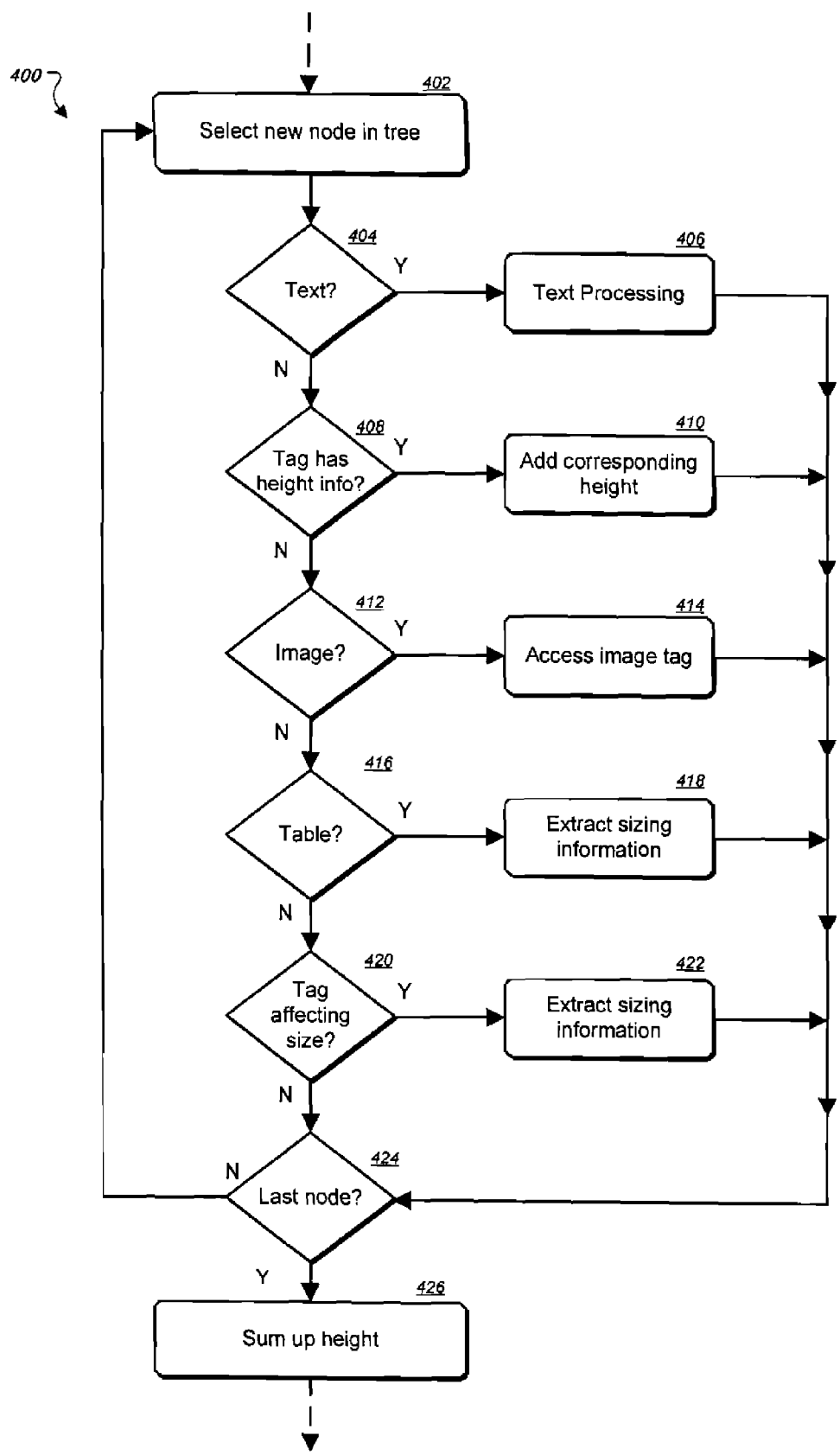
FIG. 4 is a flow chart showing example processing of nodes in an HTML tree.

FIG. 4 shows an example of a procedure 400 that the server device 102 or another device may follow when processing content, for example, an HTML-based message. A content item can be represented in a tree structure including a series of nodes. For example, each node can represent a content portion (e.g. an HTML tag or text) associated with the content item. The procedure 400 includes a step 402 of selecting a new node in the tree. In step 402 a new node can be selected, for example, an html element, and in subsequent steps one or more checks may be performed on the selected content to carry out the appropriate height estimating associated with the content type. The content selected may consist of one or more parsed elements, such as HTML tags, or the text associated with those HTML tags, for example. The selection of content may in some implementations begin with nested elements. Procedure 400 may be performed recursively on elements within a node selected in step 402. For example, if a node in an HTML tree contains one or more nodes, the procedure 400 can be performed in a depth-first recursion on each node.

Once a new node has been selected, a text check 404 can be performed to determine if that node consists of a text or some other content. If the node contains text, a text processing step 406 can be performed on the content to extract useful information. The text processing step, for example, may include steps similar to those of the text processing procedure 300, in which characters and line wraps are counted to determine a height estimate. Other text processing techniques can be used, such as counting the total number of words.

In step 408 it is determined whether the tag contains height information. For example, this can be the case if the tag has a line break. A line break may consist of a paragraph <p> or a line break <br> tag, according to the HTML nomenclature. If a line break is present a step 410 to add corresponding height can be performed.

In step 412, it is determined whether the node contains an image. If the node does contain an image, a step to access the image tag 414 is performed, in which relevant data, for example the height, is extracted.

In step 416 it is determined if the node contains a table. If it is a table, a step to extract the sizing information 418 is performed. For example, the height of a table row may be estimated by computing the height of the individual cells and using the height of the tallest cell. These heights of each row can be summed to give an estimate of the height of the entire table. In another example the height may be specified in the tag. Procedure 400 can involve recursive processing of individual table cells in step 418. For example, a cell may contain one or more nested nodes, in which case a processing analogous to the procedure 400 can be performed on each node within the cell.

In step 420, it is determined if the tag contains sizing information. If the tag does contain sizing information, a step 422 is performed to extract the sizing information from that tag. For example, a <textarea> tag may contain sizing information by specifying the number of rows and columns. In another example, the tag may indirectly contain sizing information, such as a link to a CSS document. In that example, step 422 may be performed to extract sizing information from the linked document. In step 424 a check is performed to determine if the node is the last node in the series. If it is not the last node, a new node is selected in the tree 402. If the node checked in step 424 is the last node, a step is performed to sum up the height 426 from all the previous steps.

In other implementations, additional steps can be performed before step 424 to check for elements affecting size. For example, other HTML elements, such as a <frame> tag may contain pixel dimensions that could be used to calculate the height of an element. In addition, other elements may indirectly specify size, for example, a style attribute or another CSS element or reference. As another example, if a markup language that supports columns were to be used (e.g., if HTML would be extended with such a feature), one or more steps for processing the column(s) could be added to the procedure 400.

The height determined in step 426 can, for example, be used to determine a number of advertisements that may be presented together with the message in a web browser window. In that example, the determination of the number of ads to display may be made by software on the client device 106, the advertisement server 104, or the server device 102, to name a few. A request can then be made to an advertisement server to retrieve that number of advertisements, or a number of messages equivalent to the height computed, before the message is rendered in the web browser window, to name just two examples.

One approach to performing an estimation can involve rendering the content item in a virtual browser 118 shown in FIG. 1. For example, the height in pixels may be measured of an email message rendered on a virtual canvas within the virtual browser. This can be accomplished by converting the HTML, text, and non text elements of a conversation into a bitmap prior to the measurement. The height of the bitmap or the height of a portion of the bitmap can then be used for the estimation. The particular method of generating a virtual browser can be based on attributes from the end user's web browser window, among other attributes. The virtual browser can render the virtual canvas entirely within a memory buffer, to name one implementation.

Figure 5:
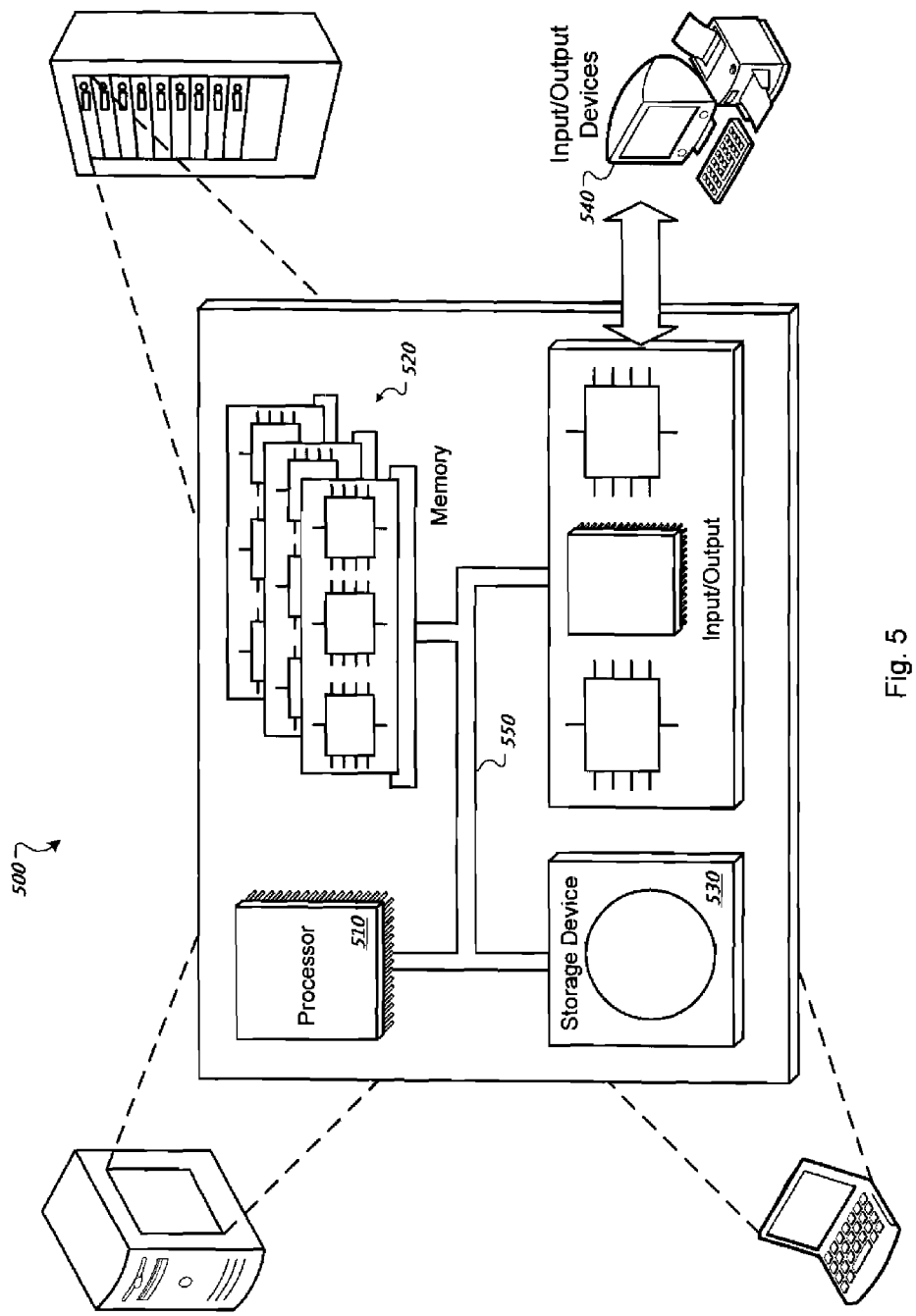
FIG. 5 is a block diagram of a computing system that can be used in connection with computer-implemented methods described in this document.

FIG. 5 is a schematic diagram of a generic computer system 500. The system 500 can be used for the operations described in association with any of the computer-implement methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method for performing an estimation on content to be presented, the method comprising:
    parsing first content that is to be presented in a graphical user interface having a display width, the parsing including at least determining a number of characters between newline characters in the first content;
    estimating, based on the parsing and the display width, a size aspect that the first content will have when presented in the graphical user interface having the display width on the display device, the estimation including using the determined number of characters and the display width to determine a number of line wraps for the first content, the estimated size aspect including an estimated vertical height of the first content based on the determined number of line wraps;
    recording the estimated size aspect; and
    causing a request to be generated that requests second content for presentation with the first content, the estimated vertical height included in the request.

2. The computer-implemented method of claim 1, wherein estimating the size aspect includes estimating a dimension of the first content in a number of pixels.

3. The computer-implemented method of claim 1, wherein the estimation uses the determined number of characters and a character-per-line ratio.

4. The computer-implemented method of claim 1, wherein at least part of the first content is in HTML format and wherein the parsing is performed on an HTML tree.

5. The computer-implemented method of claim 4, wherein the estimation is configured to take into consideration at least one of:
    a sentence length in the first content;
    a style change in the first content;
    a tag that contains height information;
    a tag that causes a line break when the first content is presented in the graphical user interface;
    information from an image tag;
    a number of rows in a <textarea> tag;
    a cell height in a table; and
    combinations thereof.

6. The computer-implemented method of claim 1, wherein at least the estimation is to be performed on a device and the graphical user interface is to be generated on another device, and wherein the display width is received at the device from the other device together with a request to provide the first content to the other device.

7. The computer-implemented method of claim 1, wherein the parsing and the estimation are performed at a server device before forwarding the first content to a client device to be presented in the graphical user interface, and wherein:
the parsing performed at the server device includes processing executable code to render a virtual presentation of the first content at the server; and
the estimation includes measuring an actual size aspect of the first content in the virtual presentation.

8. The computer-implemented method of claim 1, wherein the second content includes advertisement content to be presented together with the first content in the graphical user interface, the advertisement content being requested so that a size aspect of the advertisement content is to have a predefined relationship with the estimated size aspect.

9. The computer-implemented method of claim 1, wherein parsing the first content includes determining individual height values for components of the first content, and wherein estimated vertical height is based on the individual height values.

10. The computer-implemented method of claim 9, wherein estimating the size aspect includes determining a largest one of the individual height values.

11. The computer-implemented method of claim 9, wherein estimating the size aspect comprises includes summing at least some of the individual height values.

12. The computer-implemented method of claim 1, wherein at least different widths of individual characters are taken into account in determining the number of line wraps.

13. The computer-implemented method of claim 1, wherein at least font size of the first content is taken into account, and at least one formatting command regarding the first content is ignored, in determining the number of line wraps.

14. A computer program product tangibly embodied in an information carrier and comprising instructions that when executed by a processor perform a method for performing an estimation on content to be presented, the method comprising:
parsing first content that is to be presented in a graphical user interface having a display width, the parsing including at least determining a number of characters between newline characters in the first content;
estimating, based on the parsing and the display width, a size aspect that the first content will have when presented in the graphical user interface having the display width on the display device, the estimation including using the determined number of characters and the display width to determine a number of line wraps for the first content, the estimated size aspect including an estimated vertical height of the first content based on the determined number of line wraps;
recording the estimated size aspect; and
causing a request to be generated that requests second content for presentation with the first content, the estimated vertical height included in the request.

15. A system comprising:
a parser parsing first content that is to be presented in a graphical user interface having a display width, the parsing including at least determining a number of characters between newline characters in the first content; and
an estimation module estimating, based on the parsing and the display width, a size aspect that the first content will have when presented in the graphical user interface having the display width on the display device, the estimation including using the determined number of characters and the display width to determine a number of line wraps for the first content, the estimated size aspect including an estimated vertical height of the first content based on the determined number of line wraps;
wherein the parser and the estimation module are implemented in a computer program product, and the system records the estimated size aspect and causes a request to be generated that requests second content for presentation with the first content, the estimated vertical height included in the request.

16. The system of claim 15, wherein the graphical user interface is to be generated on another device and wherein the system receives the display width from the other device together with a request to provide the first content to the other device.

17. The system of claim 15, wherein the system is to forward the first content to a device to be presented in the graphical user interface, and wherein:
the parser processes executable code to render a virtual presentation of the first content at the server; and
the estimation module measures an actual size aspect of the first content in the virtual presentation.

18. The system of claim 15, wherein the second content includes advertisement content to be presented together with the first content in the graphical user interface, the advertisement content being requested so that a size aspect of the advertisement content is to have a predefined relationship with the estimated size aspect.

19. The system of claim 15, wherein the estimation module takes into account at least different widths of individual characters in determining the number of line wraps.

20. The system of claim 15, wherein the estimation module takes into account at least font size of the first content, and ignores at least one formatting command regarding the first content, in determining the number of line wraps.

* * * * *

UNITED STATES PATENT AND TRADEMARK OFFICE
CERTIFICATE OF CORRECTION

PATENT NO. : 8,245,130 B1
APPLICATION NO. : 11/756041
DATED : August 14, 2012
INVENTOR(S) : Matthew I. Lloyd et al.

It is certified that error appears in the above-identified patent and that said Letters Patent is hereby corrected as shown below:

Column 9, Line 31 (Claim 11), after "aspect" delete "comprises".

Signed and Sealed this
Second Day of October, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,245,130 B1 | Page 1 of 1 |
| APPLICATION NO. | : 11/756041 | |
| DATED | : August 14, 2012 | |
| INVENTOR(S) | : Lloyd et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 902 days.

Signed and Sealed this
First Day of January, 2013

David J. Kappos
*Director of the United States Patent and Trademark Office*